United States Patent [19]
Rozzi

[11] Patent Number: 6,072,589
[45] Date of Patent: Jun. 6, 2000

[54] ARRANGEMENT FOR EFFICIENT CHARACTERIZATION OF PRINTING DEVICES AND METHOD THEREFOR

[75] Inventor: William A. Rozzi, West Lakeland Township, Minn.

[73] Assignee: Imation Corp, Oakdale, Minn.

[21] Appl. No.: 08/856,371

[22] Filed: May 14, 1997

[51] Int. Cl.[7] ................................................ G06F 15/00
[52] U.S. Cl. ......................... 358/1.9; 358/456; 358/518; 358/534
[58] Field of Search ..................................... 395/101, 109; 382/237, 252, 270, 162, 167, 164; 358/296, 298, 455–460, 501, 515, 518, 529, 534–536, 1.9; 707/523; 345/88, 89, 150, 199, 431

[56] References Cited

U.S. PATENT DOCUMENTS

| | | |
|---|---|---|
| 3,972,066 | 7/1961 | Seki et al. . |
| 4,500,919 | 2/1985 | Schreiber . |
| 4,691,229 | 9/1987 | Colditz et al. . |
| 4,769,696 | 9/1988 | Utsuda et al. . |
| 4,958,220 | 9/1990 | Alessi et al. . |
| 5,296,947 | 3/1994 | Bowers . |
| 5,333,069 | 7/1994 | Spence ..................................... 358/517 |
| 5,339,176 | 8/1994 | Smilansky et al. . |
| 5,469,267 | 11/1995 | Wang ...................................... 358/298 |
| 5,473,439 | 12/1995 | Pappas ................................... 358/298 |
| 5,526,140 | 6/1996 | Rozzi ..................................... 358/535 |
| 5,612,902 | 3/1997 | Stokes .................................... 358/504 |
| 5,649,073 | 7/1997 | Knox et al. ............................. 395/109 |

(List continued on next page.)

FOREIGN PATENT DOCUMENTS

| | | |
|---|---|---|
| 0 456 832 | 11/1991 | European Pat. Off. . |
| WO 96 08916 | 3/1996 | WIPO . |

OTHER PUBLICATIONS

Adobe Systems Incorporated, "PostScript Language Reference Manual," Second Edition, Addison Wesley, 1990, pp. 294–302.

R.S. Berns, "Spectral modeling of a dye diffusion thermal transfer printer", *Journal of Electronic Imaging*, vol. 2, No. 4, Oct. 1993, pp. 359–370.

R.S. Berns et al., "CRT Colorimetry. Part I: Theory and Practice," *Color Research and Application*, vol. 18, No. 5, Oct. 1993, pp. 299–314.

R.S. Berns et al., "CRT Colorimetry. Part II: Metrology," *Color Research and Application*, vol. 18, No. 5, Oct. 1993, pp. 315–325.

Silicon Graphics, International Color Consortium Profile Format, Version 3.0a, International Color Consortium, Feb. 15, 1995.

J.S. Arney et al., "An Expanded Murray–Davies Model of Tone Reproduction in Halftone Imaging," *Journal of Imaging Science and Technology*, vol. 39, No. 6, Nov./Dec. 1995, pp. 502–508.

(List continued on next page.)

*Primary Examiner*—Edward L. Coles
*Assistant Examiner*—Joseph R. Pokrzywa
*Attorney, Agent, or Firm*—William D. Bauer

[57] ABSTRACT

A method for characterizing a halftone printer uses a reduced number of test patches to simulate the printing characteristics over the printer's full range of realizable color combinations. The method involves obtaining a set of color values from each of a limited number of test patches. Substantially fewer test patches are used than are necessary to adequately sample a full range of realizable color combinations. The method also involves constructing a halftone printer model using at least one device spot size parameter, the sets of color values, and a set of addressable units corresponding to device spot locations on a medium. Each addressable unit is smaller than a device spot. A set of color separations representing a page of color samples spanning the full range is generated. The method involves generating a set of bitmaps from the set of color separations and applying the halftone printer model to produce a digital representation of the page of color samples in a device-independent color space from the set of bitmaps. A device profile that characterizes the halftone printing process is generated as a function of the digital representation.

55 Claims, 5 Drawing Sheets

U.S. PATENT DOCUMENTS

| | | | |
|---|---|---|---|
| 5,739,928 | 4/1998 | Scott | 358/520 |
| 5,748,330 | 5/1998 | Wang et al. | 358/298 |
| 5,812,694 | 9/1998 | Mahy | 382/162 |
| 5,818,960 | 10/1998 | Gregory, Jr. et al. | 382/167 |
| 5,822,451 | 10/1998 | Spaulding et al. | 382/162 |
| 5,854,882 | 12/1998 | Wang | 358/1.9 |
| 5,920,682 | 7/1999 | Shu et al. | 358/1.9 |
| 5,933,578 | 8/1999 | Van Der Capelle et al. | 358/1.9 |

OTHER PUBLICATIONS

R.P. Brent, "Algorithms for Minimization Without Derivatives," Chapter 5, Prentice–Hall, Englewood Cliffs, NY 1992.

W.H. Press et al., "Parabolic Interpolation and Brent's Method in One Dimension," *Numerical Recipes in C*, Second Edition, Cambridge University Press, New York, 1992, pp. 402–405.

Fig. 4

ARRANGEMENT FOR EFFICIENT CHARACTERIZATION OF PRINTING DEVICES AND METHOD THEREFOR

FIELD OF THE INVENTION

The present invention relates generally to the practice of color reproduction. More particularly, the present invention relates to the practice of characterizing printing devices.

BACKGROUND OF THE INVENTION

Color printing processes involve producing full-color images on a medium, such as paper or film, through the use of colorants. Colorants are formed on media by various techniques, including halftone printing, dye diffusion, ink jet, thermal wax, and color laser printing. For example, typical halftone printing processes produce colors as arrays of dots of various colorants. In a typical multi-color, halftone printing technique, an original image is scanned through color filters to form a set of continuous-tone color separations. Each of the color separations represents intensities of one of the separated colors, such as magenta, at a plurality of pixel locations within the original image. The continuous-tone color separations are processed using a halftone screening system to produce a set of halftone color separations in the form of bitmaps. Each of the color separation bitmaps includes a plurality of bits, each bit representing the bi-level condition of one of the separated colors at an addressable unit of the medium. For example, a typical four-color printing process uses four bitmaps, with each addressable unit having four associated bi-level conditions. The addressability of the color separation bitmaps ordinarily is much higher than the addressability of the continuous-tone color separations because several bi-level, addressable units are used to represent the intensity at a single continuous-tone pixel location.

In some applications, color separation bitmaps of this type are used to form halftone printing plates or to control a halftone printing mechanism, such as a thermal mass-transfer device. In either case, the addressable units addressed by the color separation bitmaps are imaged on a printing substrate by formation of device spots carrying colorants that correspond to the separated colors. The device spots are typically sized somewhat larger than the addressable units in order to provide a degree of partial overlap that prevents the appearance of gaps between adjacent spots in areas of solid color. In a typical printing process of this type, the device spots specified by each color separation bitmap are deposited in superposition with one another in substantial registration. The human eye integrates the superimposed colors of the device spots to form a representation of the original continuous-tone image. The formation of differently colored device spots in superposition with one another produces a blending of the colors on the printing substrate. The blending occurs not only between device spots formed in superposition with one another, however, but also between adjacently formed device spots due to the partial overlap caused by the spot sizes. With this blending, for N separated colors, the device spots are capable of forming $2^N$ different colors within each addressable unit.

Color management systems attempt to produce colors that match across media and devices, locations, or time. Color specification should be device-independent, with all image data having tags that describe how to transform them into a reference color space. These tags may be assigned, for example, by input devices whose profiles describe the transformation from their raw output to the reference color space, or through color pickers within image editing applications. Output devices, such as printers or CRTs, sometimes have associated profiles that describe how to translate reference color space values into the device coordinate values that most closely match the original.

The accuracy of color rendering through typical halftone printing processes is increased by modeling the printer to a device-independent color space. Some types of device-independent color modeling techniques attempt to calibrate devices and data in terms of a device-independent color space, such as Commission Internationale de L'Éclairage (CIE) 1931 XYZ tristimulus space-coordinate values. For example, PostScript and ColorSync provide a fixed framework that defines the processing for converting color specifications from the device-independent color space into an index color space and from the index color space into a device-dependent coordinate system. Device characterization compatible with such frameworks for some classes of printing devices, such as halftone printers, have typically required empirical models that incorporate multi-dimensional lookup tables built from measurements of a large number of printed samples, generally on the order of 500 to 3000, that span the device gamut. For example, one color rendering dictionary (CRD) generation technique requires measurement of a minimum of 512 samples spanning the device gamut (all combinations of each of eight RGB levels). The sample data are typically obtained through time-consuming and tedious manual means or through use of an expensive automated apparatus.

Some printing device models, such as certain models of halftone printers, use the spot diameter of the device as a parameter. It is often assumed that the spot diameter is available either through a priori knowledge or physical measurements. However, some halftone printing devices produce irregular spots or are incapable of producing isolated device spots. These technical limitations make it difficult to measure the spot diameter.

SUMMARY OF THE INVENTION

One aspect of the present invention is directed to an arrangement and method for modeling the colorimetric response of a printing device. The method comprises: obtaining a set of color values from each of a limited number of test patches, the number of test patches being substantially less than a number of test patches necessary to adequately sample a full range of realizable color combinations; constructing a halftone printer model using at least one device spot size parameter, the sets of color values, and a set of addressable units corresponding to device spot locations on a medium, each of the addressable units having an area that is less than an area of a device spot; generating a set of color separations representing a page of color samples spanning said full range and, from the set of color separations, a set of bitmaps; applying the halftone printer model to produce a digital representation of the page of color samples in a device-independent color space from the set of bitmaps; and generating a device profile that characterizes the halftone printing process as a function of the digital representation. Various arrangements to implement the method are disclosed.

Another aspect of the present invention is directed to a data storage medium storing a computer-executable program that, when executed, performs steps related to those set forth above for characterizing a halftone printing process. These computer-executable steps include: obtaining a set of color values from each of a limited number of test patches, the number of test patches being substantially less than a number of test patches necessary to adequately sample a full range of realizable color combinations; constructing a halftone printer model using at least one device spot size parameter, the sets of color values, and a set of addressable units corresponding to device spot locations on a medium, each of the addressable units having an area that is less than an area of a device spot; generating a set of color separations representing a page of color samples spanning said full range and, from the set of color separations, a set of bitmaps; applying the halftone printer model to produce a digital representation of the page of color samples in a device-independent color space from the set of bitmaps; and generating a device profile that characterizes the halftone printing process as a function of the digital representation.

The above summary is not intended to characterize each and every aspect or disclosed embodiment of the present invention. A full appreciation of the present invention is best obtained by review of the drawings and detailed description, which follow.

BRIEF DESCRIPTION OF THE DRAWINGS

Other aspects and advantages of the present invention will become apparent upon reading the following detailed description and upon reference to the drawings in which.

While the present invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION OF THE ILLUSTRATED EMBODIMENTS

The present invention is applicable to color reproduction systems in which it is desirable to characterize printing devices using analytic device modeling techniques. The present invention has been found to be particularly advantageous for use in connection with the characterization of halftone printers.

Some halftone printer models use a large number of parameters to represent the various color combinations and other related variables. Characterizing a halftone printer using such models often requires hundreds or thousands of measurements of test patches. According to one embodiment of the present invention, a halftone printer is modeled with a small number of parameters, including the size of a device spot and color values for each color that may be obtained by combining colorants in various combinations. For a typical four-color halftone printing process, sixteen primaries and overprints are obtained by combining the four colors in various combinations. Accordingly, a four-color halftone printer model includes, in this embodiment, only sixteen parameters, as represented by the combinations of the four colors, plus one parameter for the size of a device spot. Alternatively, in applications in which greater accuracy is desirable, a devise spot size parameter can be specified for each colorant. For example, a four-color halftone printer model can use one to four device spot size parameters. Modeling the halftone printer using a model of this type involves substantially fewer measurements of test patches. For example, measurements of sixteen test patches suffice.

Figure 1:
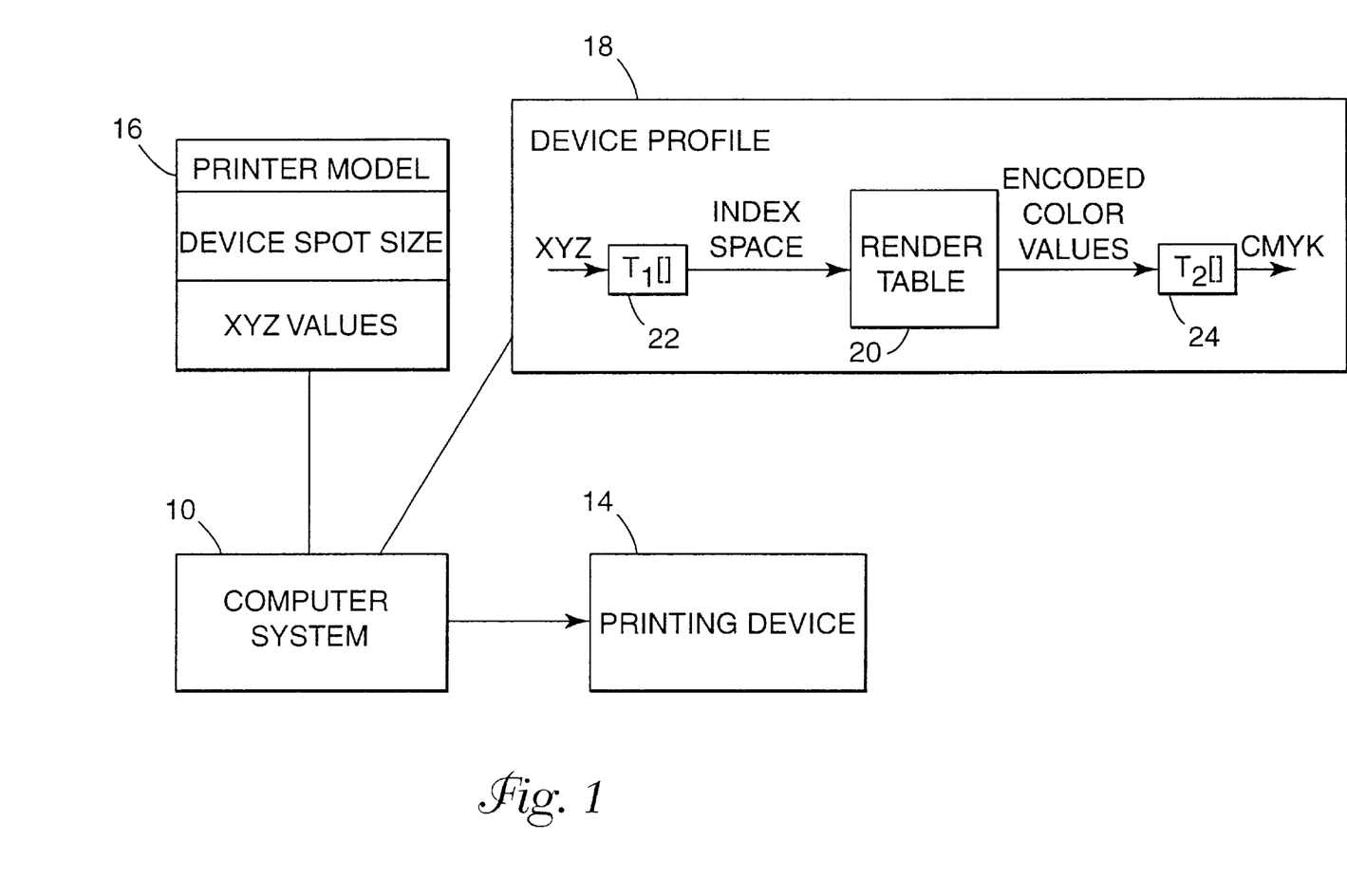
FIG. 1 illustrates a system for characterizing a halftone printer device according to one embodiment of the present invention.

Referring now to the drawings, FIG. 1 illustrates one example of a system according to the present invention configured to model a printing device 14. A computer arrangement 10, appropriately programmed, is connected to the printing device 14, for example, a laser printer, an ink jet printer, a dye diffusion device, or other halftone printer. The computer arrangement 10 may be implemented, for example, as a conventional Apple computer or IBM-compatible computer, or as a group of computers. The computer arrangement 10 uses a printer model 16 to generate a device profile 18, such as a PostScript color rendering dictionary (CRD) or a ColorSync profile, that characterizes the printing device 14.

Figure 2:
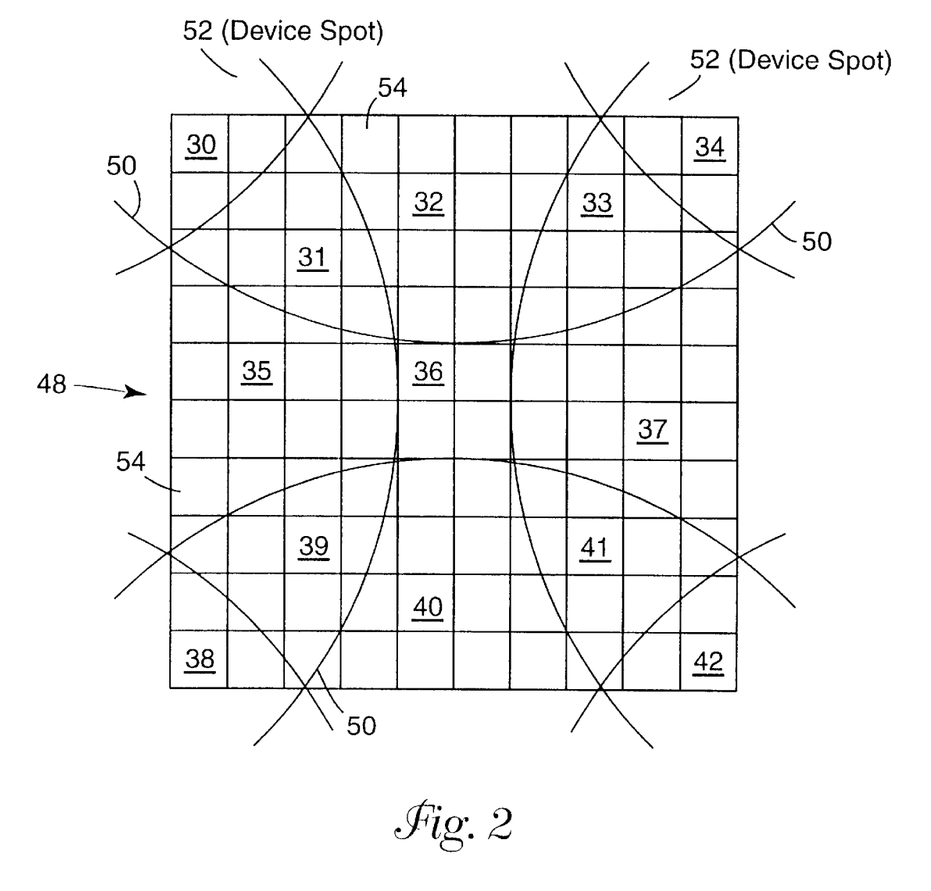
FIG. 2 is a diagram illustrating a plurality of regions produced in an addressable unit by a multi-color, halftone output according to one embodiment of the present invention.

The printer model 16 provides a geometric model of device spots formed on a medium relative to the positions of addressable units identifying the locations of the device spots on the medium. FIG. 2 illustrates one such addressable unit 48. As illustrated in FIG. 2, the device spots 52 have edges that intersect to form a plurality of arcs 50. The arcs 50 carve out a plurality of regions 30–42 within an addressable unit 48. Within each addressable unit 48, the geometric model defines the areas of the regions and the colors resulting from device spots that overlap. As discussed in more detail below in connection with FIGS. 3A–3B, the geometric model defines these region areas to obviate the conventional and burdensome use of a large number of parameters to model the printing device. The computer arrangement 10 generates the device profile 18 to describe the printer in terms of a standard color space, such as a calibrated RGB coordinate system where the transformation between it and the XYZ space is known.

Assuming in this example embodiment that the device profile 18 is generated as a CRD, the main components of the device profile 18 are a multi-dimensional lookup table, or render table 20, and two sets of transformation procedures 22 and 24. The first set of transformation procedures 22 transforms a set of coordinates from a device-independent color space, such as the XYZ color space, to an index space, for example, a calibrated RGB color space. The index space is selected to facilitate interpolation while using the render table 20. The render table 20 is used to convert coordinates in the index space to an encoded device color space. The second set of transformation procedures 24 transforms the encoded device color space coordinates into the final device color coordinates in a device color space.

Figure 3A:
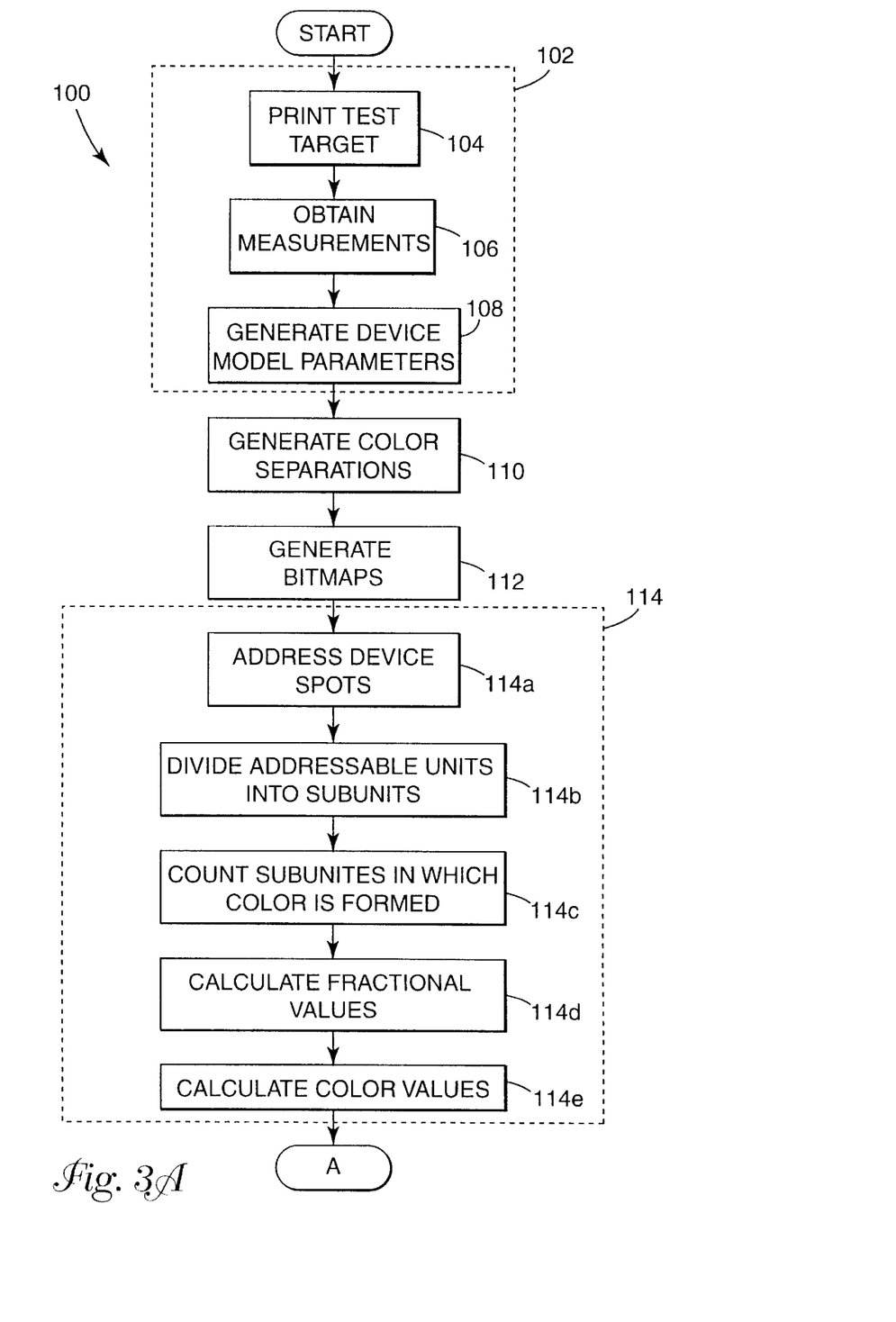
FIGS. 3A–3B comprise a flow chart representing a process for characterizing a halftone printer device according to one embodiment of the present invention.
Figure 3B:
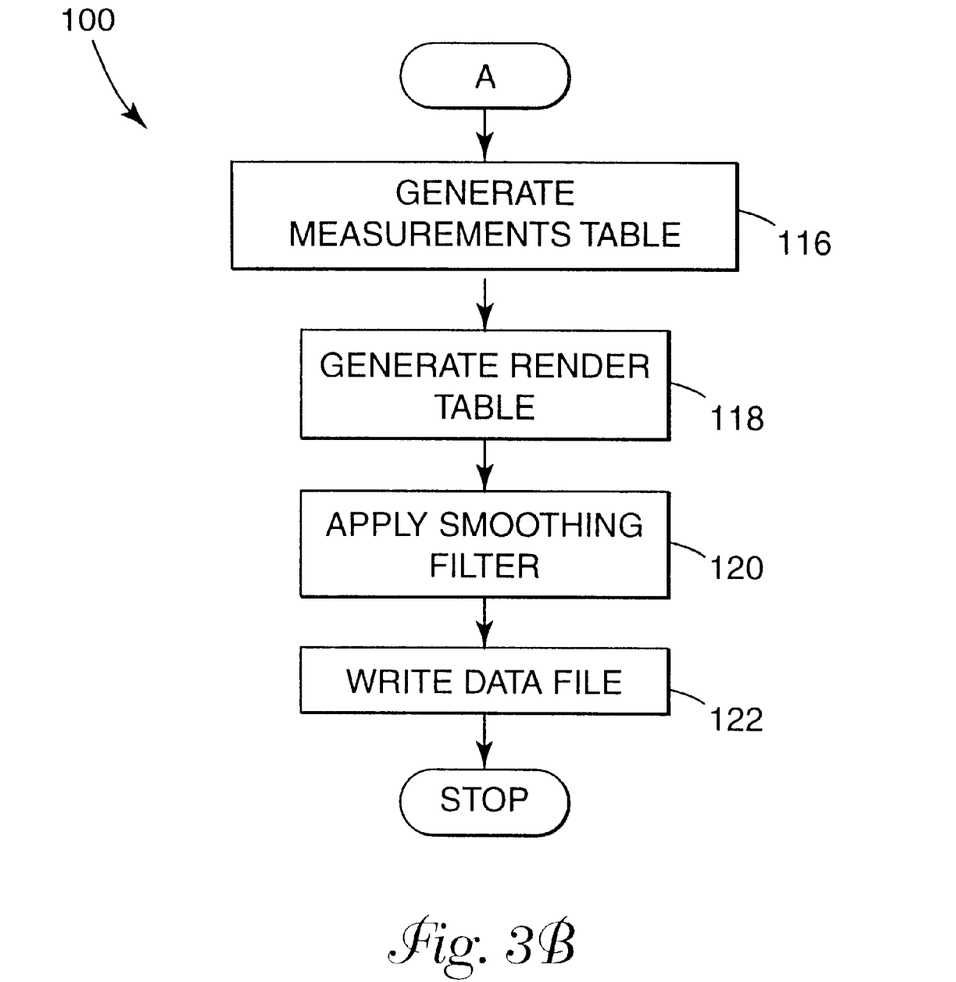

FIGS. 3A–3B comprise a flow chart illustrating a process 100 in which the computer arrangement 10 of FIG. 1 is used in a color reproduction process according to one method embodiment of the present invention. The steps depicted in FIGS. 3A–3B can be executed, for example, by the computer arrangement 10 in connection with a computer-executable program.

A block 102 of FIG. 3A depicts the computer obtaining generally parameters for the device model, including the device spot size and the XYZ values for the ink and medium combination's primaries and overprints, and the sets of procedures 22 and 24. To obtain these parameters, the computer arrangement 10 provides test image data to the printing device 14 of FIG. 1. In response to the test image data, the printing device 14 prints a test target, which consists of a number of test patches representing the primaries and overprints of the printer. For example, a test target produced by a bi-level, four-color printer would include the four primaries (e.g., cyan, magenta, yellow, and black), the eleven overprints, such as cyan-magenta, that are produced by combining the primaries, and a medium reference, e.g., white. This process is depicted at a block 104.

At a block 106, the computer arrangement 10 receives color measurements of the test target from a color-measuring instrument (not illustrated) and provides these measurements to a four-color halftone printer model, as depicted at a block 108. The color-measuring instrument can be implemented, for example, using a spectrophotometer, which measures the apparent reflectance of light as a function of wavelength, or a calorimeter, which typically determines a set of tristimulus values of a color. From the color measurements, the computer arrangement 10 derives a set of values in a reference color space, such as the XYZ coordinate system.

For the four-color halftone printer model, estimates of the device spot size may be specified or obtained using conventional techniques, such as microscopic inspection of test samples, density measurements of an appropriate test target, or as described below in connection with FIG. 4.

In connection with the block 102, the sets of procedures 22 and 24 of the system illustrated in FIG. 1 are also selected. The first set of procedures 22 is applied to the reference color space (XYZ) values to produce the indices into the render table 20. This transformation is selected to convert the reference color space into a better space for interpolation, which is used when applying the render table 20 to image data. Selection of the parameters defining the set of procedures 22 is not critical and need only define an index color space that is more uniformly distributed than XYZ space for interpolation. For example, a calibrated RGB space may be used as the index color space.

If needed, the second set of procedures 24 modifies the interpolated render table values, for example, on a component-by-component basis, to produce the final device colors. The set of procedures 24 allows the render table to produce values that are more linear with respect to the actual device colorants. The linearized values produced from the render table 20 are subsequently transformed through 1-D lookup tables to produce the final device coordinates. The 1-D lookup tables are generated by linearizing a set of color measurements of color patch sequences known as step wedges. In certain applications in which the values retrieved from the render table 20 are sufficiently linear with respect to the actual device colorants, the set of procedures 24 can be defined as identity transforms. In this case, the final device coordinates are obtained directly from the render table 20.

After the model parameters are generated, flow proceeds from the block 102 to a block 110, where the computer arrangement 10 generates a set of continuous-tone CMYK separations that, if appropriately printed, would produce a page of samples that span the range or gamut of colors that the printer can produce. The continuous-tone CMYK separations are generated as follows. First, a set of color-spanning samples (e.g., 512 samples representing all combinations of each of eight RGB intensity levels) is selected, for example, by uniformly sampling an RGB color cube. Next, the samples are converted from RGB to CMYK using a conventional form of grey component replacement (GCR) to generate unique samples in CMYK space. Sampling an RGB color cube instead of CMYK space avoids the need to measure many redundant, essentially black patches. The CMYK coordinates of each sample are recorded for later use.

At a block 112, the computer arrangement 10 generates halftone bitmaps for the continuous-tone color separations using the halftone process to be modeled. To generate the halftone bitmaps, the computer arrangement 10 applies the halftone screening system characterizing the halftone process to each continuous-tone color separation to obtain a corresponding halftone color separation in the form of a bitmap. The bitmaps thus generated determine where the device spots would be placed if the page were printed.

As depicted generally at a block 114, the computer then applies the halftone printer model (16 of FIG. 1) to the bitmaps to produce a digital representation of the page of color-spanning samples in a device-independent color space, e.g., XYZ space. To produce this representation of the page, the computer arrangement 10 identifies the locations of the device spots 52 of FIG. 2 with respect to each of the addressable units 48 of the page based on the locations specified in the halftone bitmaps. In the example illustrated in FIG. 2, the device spots 52 are centered on centers of the addressable units 48. Each device spot 52 is assigned the color corresponding to the particular bitmap that addressed it. For example, if a particular device spot 52 is addressed by the bitmap for the yellow color separation, the device spot 52 is assigned the color yellow. This process is depicted at a block 114a.

Next, the computer divides each of the addressable units 48 into a plurality of addressable subunits 52 at a block 114b in order to approximate the areas of the regions 30–42. As depicted at a block 114c, the computer arrangement 10 counts, for each of the $2^N$ different colors produced by combining the N colorants and each of the addressable units 48, the subunits 54 in which the respective color is formed in the regions 30–42 by the device spots 52. In certain applications in which simpler calculations are desired, this approximation process may be simplified by centering the device spots 42 on corners of the addressable units 48 rather than on the centers of the addressable units 48. By centering the device spots on the corners of the addressable units, the regions 30–42 can be determined using a lesser number of adjacently formed device spots 52. For examples of corner-centered addressing, as well as unit-centered addressing, reference may be made to U.S. Pat. No. 5,526,140, entitled EMULATION OF A HALFTONE PRINTED IMAGE ON A CONTINUOUS-TONE DEVICE and issued to William A. Rozzi, incorporated herein by reference.

For each of the addressable units 48 and for each of the $2^N$ different colors, the computer arrangement 10 then divides the number of subunits 54 in which the color is formed by the total number of subunits, as depicted at a block 114d. In this manner, the computer arrangement 10 obtains fractional values for the $2^N$ different colors formed in the regions 30–42 in each of the addressable units 48. Each fractional value thus obtained approximates the area of the region 30–42 in which the color is formed as a fraction of the overall area of the addressable unit 48. The accuracy of this approximation method increases as the number of subunits 54 increases.

Based on the fractional values calculated for the $2^N$ different colors formed in the addressable units 48, the computer arrangement 10 calculates a set of color values for the addressable units 48 at a block 114e. The color values are calculated in a device-independent color space. Using the XYZ color space, the fractional values are used, for example, as weighting coefficients A in a weighted averaging process, such as a process described by the Neugebauer equations:

$$X = \sum_{i=1}^{L} A_i X_i$$

$$Y = \sum_{i=1}^{L} A_i Y_i$$

$$Z = \sum_{i=1}^{L} A_i Z_i$$

where L is $2^N$, $X_i$ represents the tristimulus X component value measured for one of the $2^N$ different colors, $Y_i$ represents the tristimulus Y component value measured for one of the $2^N$ different colors, $Z_i$ represents the tristimulus Z component value measured for one of the $2^N$ different colors. The values for $X_i$, $Y_i$, and $Z_i$ are obtained from the color measuring device as parameters to the model. Through this weighted averaging process, device-independent color values are calculated for each of the CMYK samples. It should be understood, however, that other techniques may be used to calculate the device-independent color values without departing from the teaching of the present invention.

Using the representation of the page of continuous-tone separations generated in connection with the block 114, flow proceeds to a block 116, in which the computer arrangement 10 generates a measurements table containing index color space values, for example, calibrated RGB color values, indexed by device coordinates. To generate the measurements table, the computer integrates device-independent page values within each continuous-tone separation sample. A band around the edges of each patch is excluded from the integration to minimize spatial dependencies resulting from the halftoning process. The computer arrangement 10 converts integrated device-independent values into the index space using the transformation defined by the set of procedures 22 and stores the index color space values in the measurements table.

The computer arrangement 10 then generates the render table 20 at a block 118 by inverting the measurements table to generate a table of device coordinates indexed by, for example, calibrated RGB values. For each set of desired calibrated RGB indices, computer arrangement 10 searches the measurements table for the index color space values closest to the desired values. The computer arrangement 10 uses the device coordinates corresponding to the closest values as the entry in the render table 20. Conventional interpolation techniques may be used to refine the device coordinate values.

After the device coordinates are computed for the entries in the render table 20, the computer arrangement 10 optionally applies a smoothing filter, such as a simple triangle kernel, to the render table 20 at a block 120. Smoothing the table reduces the likelihood of discontinuities in printed color gradients.

The computer arrangement 10 then writes the device profile 18, which includes, for example, the sets of transformation functions 22 and 24 and a hexadecimal representation of the render table 20, to a data file, as depicted at a block 122. For example, the data file may be written as an ASCII file in a PostScript format.

In connection with certain color reproduction applications, the device profile 18 generated above is used to reproduce a color image accurately on the printing device 14. Turning again to FIG. 1, an image file (not illustrated) representing a color image in a reference color space, such as the XYZ color space, is stored in the computer arrangement 10. The computer arrangement 10 transforms the coordinates in the reference color space into an index color space, such as a calibrated RGB color space, using the set of procedures 22. The computer then indexes the render table 20 by the index color space coordinates and retrieves entries from the render table 20. These entries represent the color in an encoded device color space specific to the printing device 14.

Using the set of transformation procedures 24 as discussed previously, the computer arrangement 10 then transforms the encoded device color space coordinates into final device color space coordinates used by the printing device 14. Assuming the set of procedures 24 is defined as identity transforms, the render table 20 itself produces the final device color space coordinates. The computer arrangement 10 sends the final device color space coordinates to the printing device 14, which produces the color on the medium.

The halftone printer model described above in connection with FIGS. 1–3 uses the device spot diameter as a parameter. While the device spot diameter may be specified or measured using conventional techniques, technical limitations of a typical halftone printer may make it difficult to determine the device spot diameter accurately. For example, some halftone printers print irregular spots or are unable to print an isolated device spot.

Figure 4:
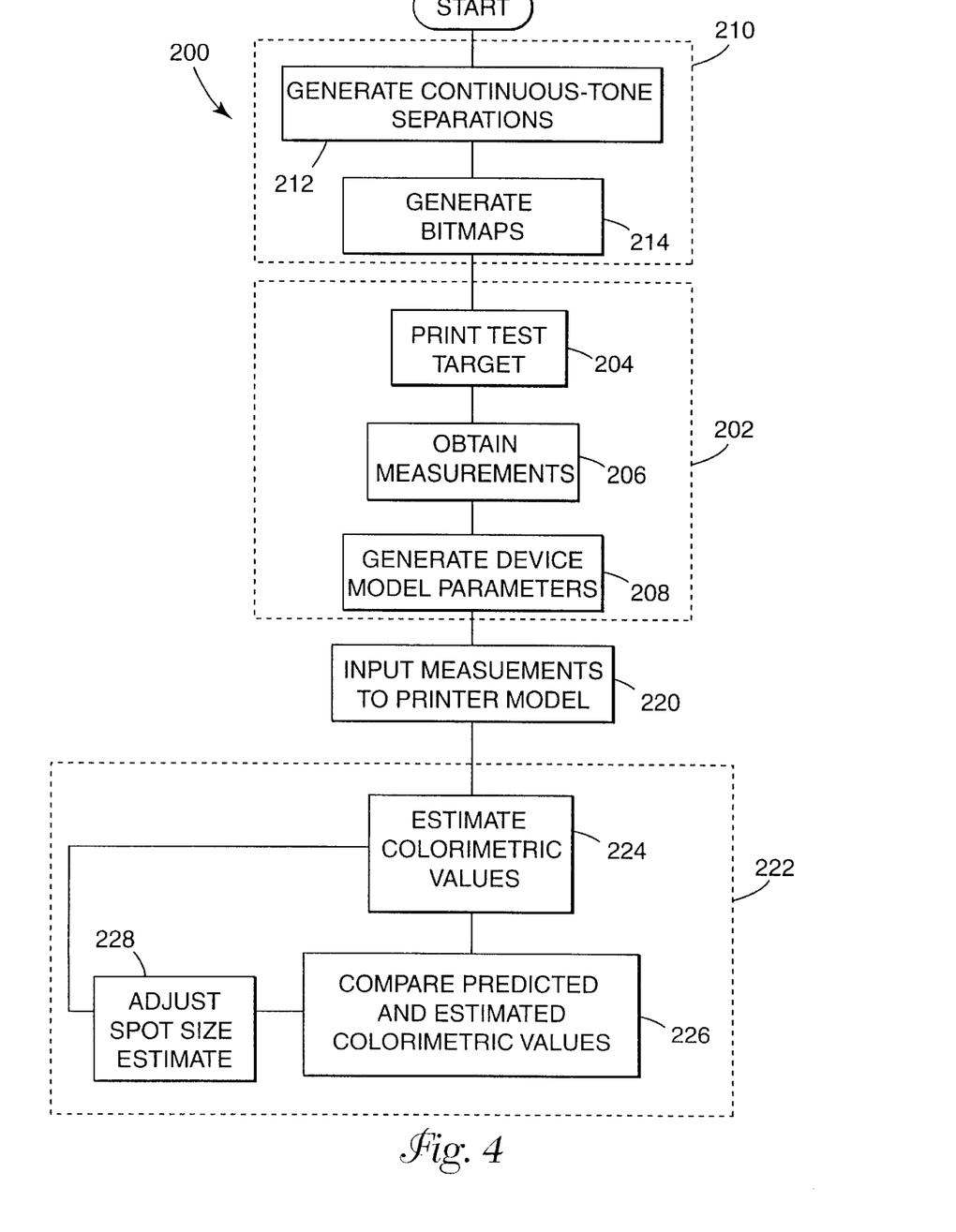
FIG. 4 is a flow chart representing a process for estimating a device spot size according to another aspect of the present invention that may be used in connection with the system of FIG. 1.

FIG. 4 is a flow chart representing one example method 200 in which the system of FIG. 1 estimates the device spot diameter using an iterated printer model according to another aspect of the present invention. The method depicted in FIG. 4 can be executed, for example, by the computer arrangement 10 in connection with a computer-executable program.

A block 210 depicts the computer arrangement 10 producing halftone bitmaps generally. To produce the halftone bitmaps, the computer arrangement 10 generates a set of continuous-tone color separations, as depicted at a block 212. When appropriately printed, the continuous-tone color separations produce the color patches comprising the test target addressed in connection with FIGS. 3A–3B and additional patches that form a step wedge for each colorant. Each step wedge contains a sequence of color samples progressing from white to complete saturation of a colorant. For example, the color samples in a cyan step wedge progress from white to solid cyan, with intermediate steps representing increasing proportions of cyan.

The number of additional test patches used depends on the application and on the desired accuracy. In certain applications in which especially high accuracy is desired, the computer arrangement 10 estimates a different spot diameter for each color separation. In applications of this type, four additional test patches for each color separation, evenly spaced in value, are typically more than adequate. In other types of applications in which such accuracy is not required, however, one diameter estimate for all color separations suffices. In applications of this type, fewer additional test patches are sufficient.

If only one diameter estimate is desired, the additional test patches may be selected from a single separation color or from multiple separation colors. The additional test patches are typically chosen from a single separation color. In certain applications, however, the printing of multiple colorants at one location produces a significantly different spot diameter than the printing of one colorant. In such applications, test patches that represent midtones of one separation color over solids of one or more additional separation colors may be used to improve the accuracy of the estimation process.

As depicted at a block 214, the computer arrangement 10 applies the halftone process to be modeled to the continuous-tone color separations to obtain halftone separation bitmaps. As discussed above in connection with FIG. 3, to generate the halftone bitmaps, the computer arrangement 10 applies the halftone screening system characterizing the halftone process to each continuous-tone separation in the form of a bitmap. The bitmaps thus generated determine where the device spots are placed when the page is printed.

After the halftone bitmaps are generated in connection with the block 214, flow proceeds to a block 202, which depicts the computer arrangement 10 generating model parameters generally. To generate the model parameters, the computer arrangement 10 causes the printing device 14, illustrated as a halftone printer, to produce a test target using the device spot locations specified by the halftone bitmaps. This process is depicted at a block 204. Flow then proceeds to a block 206, at which the computer arrangement 10 receives device-independent color values of the test target from a color-measuring instrument, such as a spectrophotometer or a calorimeter. As depicted at a block 208, the computer arrangement 10 provides these measurements as parameters to the printer model (16 of FIG. 1). Because the device spot diameter is assumed to be unknown, however, the computer arrangement 10 does not initially determine a precise value of the device spot diameter. Instead, the computer arrangement 10 selects an initial estimate of the device spot diameter based on, for example, technical specifications. The value of the initial estimate is not critical, however, as it is refined through an iterative process as described below.

At a block 220, the computer arrangement 10 receives the colorimetric measurements of the step wedge patches from the test target. With the initial estimate of the device spot diameter and the halftone separation bitmaps, the computer arrangement 10 applies the printer model 16 iteratively as depicted generally at a block 222 to determine the value of the device spot diameter that yields the most accurate predictions of the colorimetric measurements obtained at the block 220.

The iterative application of the printer model 16 is based on a conventional search technique, such as the method disclosed in Brent, "Algorithms for Minimization without Derivatives," chapter 5. This method, known as Brent's method, uses inverse parabolic interpolation to find the minimum of a function in one dimension. In the example method 200 of FIG. 4, the computer arrangement 10 determines the minimum mean squared error between the measured and predicted colorimetric values by varying the spot diameter. To determine the minimum mean squared error, the computer arrangement 10 predicts the colorimetric values of the test patches using the printer model 16 with the initial estimate of the device spot diameter, as depicted at a block 224. At a block 226, the computer arrangement 10 compares these estimates to the colorimetric values obtained at the block 220.

Next, the computer arrangement 10 adjusts the spot size estimate based on the error or difference between the estimated colorimetric values and the measured colorimetric values, as depicted at a block 228. The process depicted at the block 222 is repeated until the mean squared error between the predicted and measured colorimetric values is minimized. The device spot diameter estimate that yields the minimum mean squared error is then used as the device spot diameter parameter in connection with the system addressed above in connection with FIG. 1.

Consistent with another embodiment of the present invention, the printer model 16 may be simplified when estimating the spot diameter, to reduce the computational requirements for each iteration of the process depicted at the block 222. If the colorimetric measurements are restricted to $L^*$, for example, only the CIE Y values are predicted instead of X, Y, and Z values. Furthermore, if a test patch includes only one colorant, then a two-color model (paper and one colorant) may be used instead of the full $2^N$-color model.

The various embodiments described above are provided by way of illustration only and should not be construed to limit the invention. Those skilled in the art will readily recognize various modifications and changes that may be made to the present invention without strictly following the exemplary embodiments and applications illustrated and described herein, and without departing from the true spirit and scope of the present invention, which is set forth in the following claims.

What is claimed is:

1. A method for characterizing a halftone printing process that forms device spots, the method comprising:

obtaining a set of first color values from each of a limited number of test patches, the number of test patches being substantially less than a number of test patches necessary to adequately sample a full range of realizable color combinations;

constructing a halftone printer model using at least one device spot size parameter, the sets of first color values, and a set of addressable units corresponding to device spot locations on a medium, each of the addressable units having an area that is less than an area of a device spot;

generating a set of color separations representing a page of color samples spanning said full range and, from the set of color separations, a set of bitmaps;

applying the halftone printer model to produce a digital representation of the page of color samples in a device-independent color space from the set of bitmaps by:

addressing the device spots to the addressable units based on the bitmaps, thereby producing a plurality of regions within each of the addressable units, each of the plurality of regions having one of $2^N$ colors realizable through bi-level combinations of N colorants, dividing each of the addressable units into a plurality of subunits, determining a number of the subunits in which each of the $2^N$ colors is formed, for each of the $2^N$ colors, calculating a fractional value by dividing a number of the subunits in which the respective color is formed by the total number of subunits, and calculating a set of second color values for each of the addressable units based on the fractional values calculated for each of the $2^N$ colors formed in the respective addressable unit; and generating a device profile that characterizes the halftone printing process as a function of the digital representation.

2. A method for characterizing a halftone printing process, according to claim 1, further comprising obtaining the sets of first color values using at least one of the following: a spectrophotometer, and a calorimeter.

3. A method for characterizing a halftone printing process, according to claim 1, further comprising centering the device spots on centers of the addressable units after determining the locations of the device spots.

4. A method for characterizing a halftone printing process, according to claim 1, further comprising centering the device spots on corners of the addressable units after determining the locations of the device spots.

5. A method for characterizing a halftone printing process, according to claim 1, further comprising:
   selecting the color samples from an RGB color cube after determining the device spot locations, and
   converting the selected color samples into the device-dependent color space.

6. A method for characterizing a halftone printing process, according to claim 1, further comprising:
   for each of the color samples, integrating the sets of second color values calculated for the addressable units corresponding to the respective color sample to generate a set of integrated color values;
   converting the integrated color values into index color values in an index space; and
   storing the index color values as entries in a first table.

7. A method for characterizing a halftone printing process, according to claim 6, further comprising inverting the first table to generate a second table.

8. A method for characterizing a halftone printing process, according to claim 7, further comprising applying a smoothing filter to the second table.

9. A method for characterizing a halftone printing process, according to claim 7, further comprising storing the second table in the device profile.

10. A method for characterizing a halftone printing process, according to claim 9, further comprising storing data representing at least one transformation procedure in the device profile.

11. A method for characterizing a halftone printing process, according to claim 1, further including estimating the device spot size parameter by
   providing an initial value as an estimate of the device spot size parameter,
   printing the test patches using test patch bitmaps representative of the test patches,
   obtaining the first color values by measuring the test patches,
   predicting the first color values for the test patches using the halftone printer model,
   adjusting the estimate based on a mean squared error between the predicted first color values and the measured first color values,
   iteratively performing the predicting and adjusting steps until the mean squared error is minimized, and
   when the mean squared error is minimized, using the estimate corresponding to the minimum mean squared error as the device spot size parameter.

12. A method for characterizing a halftone printing process that uses N color separation bitmaps to form device spots at locations on a medium as identified by first addressable units, the halftone printing process capable of printing a full range of physically realizable color combinations, the method comprising:
   forming a test target having a set of a limited number of test patches on the medium, the number of test patches in the set being substantially less than the number of test patches necessary to adequately sample the full range of physically realizable color combinations;
   obtaining a set of first color values from each of the limited set of test patches;
   constructing a halftone printer model using at least one device spot diameter parameter and using a set of second addressable units identifying locations on the medium, each of the second addressable units having an area less than an area defined by said at least one device spot diameter parameter;
   determining locations of the device spots on the medium with respect to the second addressable units;
   generating a set of color separations capable of being printed as a page of color samples that span the full range of physically realizable color combinations and a set of bitmaps using the set of color separations;
   using the halftone printer model, translating the set of bitmaps to produce a digital representation of the page of color samples in a device-independent color space by:
      addressing the device spots to the second addressable units based on the bitmaps, thereby producing a plurality of regions within each of the second addressable units, each of the plurality of regions having one of $2^N$ colors realizable through bi-level combinations of N colorants,
      dividing each of the second addressable units into a plurality of subunits,
      determining a number of the subunits in which each of the $2^N$ colors is formed,
      for each of the $2^N$ colors, calculating a fractional value by dividing a number of the subunits in which the respective color is formed by the total number of subunits, and
      calculating a set of second color values for each of the second addressable units based on the fractional values calculated for each of the $2^N$ colors formed in the respective second addressable unit; and
   generating a device profile that characterizes the halftone printing process as a function of the digital representation.

13. A method for characterizing a halftone printing process, according to claim 12, further including obtaining the set of first color values from at least one of the following: a spectrophotometer, and a calorimeter.

14. A method for characterizing a halftone printing process, according to claim 12, further including centering the device spots on centers of the second addressable units after obtaining the set of first color values.

15. A method for characterizing a halftone printing process, according to claim 12, further including centering the device spots on corners of the second addressable units after obtaining the set of first color values.

16. A method for characterizing a halftone printing process, according to claim 12, further including:
   selecting the color samples from an RGB color cube after determining the locations of the device spots, and
   converting the selected color samples into the device-dependent color space.

17. A method for characterizing a halftone printing process, according to claim 12, further comprising:
   for each of the color samples, integrating the sets of second color values calculated for the second addressable units corresponding to the respective color sample to generate a set of integrated color values;
   converting the integrated color values into index color values in an index space; and
   storing the index color values as entries in a first table.

18. A method for characterizing a halftone printing process, according to claim 17, further comprising inverting the first table to generate a second table.

19. A method for characterizing a halftone printing process, according to claim 18, further comprising applying a smoothing filter to the second table.

20. A method for characterizing a halftone printing process, according to claim 18, further comprising storing the second table in the device profile.

21. A method for characterizing a halftone printing process, according to claim 20, further comprising storing data representing at least one transformation procedure in the device profile.

22. A method for characterizing a halftone printing process, according to claim 12, wherein the device spot size parameter is estimated by providing an initial value as an estimate of the device spot size parameter, printing the test patches using test patch bitmaps representative of the test patches obtaining the first color values by measuring the test patches, predicting sets of the first color values for the test patches using the halftone printer model, adjusting the estimate based on a mean squared error between the predicted first color values and the measured first color values, iteratively performing the predicting and adjusting steps until the mean squared error is minimized, and when the mean squared error is minimized, using the estimate corresponding to the minimum mean squared error as the device spot size parameter.

23. A system for characterizing a halftone printing process that forms device spots, the system comprising:

means for obtaining a set of first color values from each of a limited number of test patches, the number of test patches being substantially less than a number of test patches necessary to adequately sample a full range of realizable color combinations;

means for constructing a halftone printer model using at least one device spot size parameter, the sets of first color values, and a set of addressable units corresponding to device spot locations on a medium, each of the addressable units having an area that is less than an area of a device spot;

means for generating a set of color separations representing a page of color samples spanning said full range and, from the set of color separations, a set of bitmaps;

means for applying the halftone printer model to produce a digital representation of the page of color samples in a device-independent color space from the set of bitmaps by:

addressing the device spots to the addressable units based on the bitmaps, thereby producing a plurality of regions within each of the addressable units, each of the plurality of regions having one of $2^N$ colors realizable through bi-level combinations of N colorants, dividing each of the addressable units into a plurality of subunits, determining a number of the subunits in which each of the $2^N$ colors is formed, for each of the $2^N$ colors, calculating a fractional value by dividing a number of the subunits in which the respective color is formed by the total number of subunits, and calculating a set of second color values for each of the addressable units based on the fractional values calculated for each of the $2^N$ colors formed in the respective addressable unit; and means for generating a device profile that characterizes the halftone printing process as a function of the digital representation.

24. A system for characterizing a halftone printing process used by a halftone printer to form device spots, the system comprising:

a computer arrangement programmed to command the halftone printer to form a test target having a set of a limited number of test patches, the number of test patches in the set being substantially less than the number of test patches necessary to adequately sample a full range of realizable color combinations;

a color measuring device configured and arranged to obtain a set of first color values from each of the limited number of test patches and to provide the sets of first color values to the computer arrangement; and the computer arrangement further programmed to provide a halftone printer model created as a function of at least one device spot size parameter and as a function of a set of addressable units that identify locations on a medium, each of the addressable units having an area that is less than an area of one of the device spots, determine locations of the device spots on the medium with respect to the addressable units, and generate a set of color separations representing a page of color samples that span said full range and, from the set of color separations, a set of bitmaps, apply the halftone printer model to produce a digital representation of the page of color samples in a device-independent color space from the set of bitmaps by:

addressing the device spots to the addressable units based on the bitmaps, thereby producing a plurality of regions within each of the addressable units, each of the plurality of regions having one of $2^N$ colors realizable through bi-level combinations of N colorants, dividing each of the addressable units into a plurality of subunits, determining a number of the subunits in which each of the $2^N$ colors is formed, for each of the $2^N$ colors, calculating a fractional value by dividing a number of the subunits in which the respective color is formed by the total number of subunits, and calculating a set of second color values for each of the addressable units based on the fractional values calculated for each of the $2^N$ colors formed in the respective addressable unit, and generate a device profile that characterizes the halftone printing process as a function of the digital representation.

25. A system for characterizing a halftone printing process, according to claim 24, wherein the color measuring device comprises at least one of the following: a spectrophotometer, and a calorimeter.

26. A system for characterizing a halftone printing process, according to claim 24, wherein the computer arrangement is programmed to center the device spots on centers of the addressable units.

27. A system for characterizing a halftone printing process, according to claim 24, wherein the computer arrangement is programmed to center the device spots on corners of the addressable units.

28. A system for characterizing a halftone printing process, according to claim 24, wherein the computer arrangement is programmed to select the color samples from an RGB color cube and convert the selected color samples into the device-dependent color space.

29. A system for characterizing a halftone printing process, according to claim 24, wherein the computer arrangement is further programmed to for each of the color samples, integrate the sets of second color values calculated for the addressable units corresponding to the respective color sample to generate a set of integrated color values;

convert the integrated color values into index color values in an index space; and store the index color values as entries in a first table.

30. A system for characterizing a halftone printing process, according to claim 29, wherein the computer arrangement is further programmed to invert the first table to generate a second table.

31. A system for characterizing a halftone printing process, according to claim 30, wherein the computer arrangement is further programmed to apply a smoothing filter to the second table.

32. A system for characterizing a halftone printing process, according to claim 30, further comprising a data storage device configured and arranged to store the second table in the device profile.

33. A system for characterizing a halftone printing process, according to claim 32, wherein the data storage device is further configured and arranged to store data representing at least one transformation procedure in the device profile.

34. A system for characterizing a halftone printing process, according to claim 24, wherein the computer arrangement is programmed to estimate the device spot size parameter by providing an initial value as an estimate of the device spot size parameter, printing the test patches using test patch bitmaps representative of the test patches, obtaining the first color values by measuring the test patches predicting sets of the first color values for the test patches using the halftone printer model, adjusting the estimate based on a mean squared error between the predicted first color values and the measured first color values, iteratively performing the predicting and adjusting steps until the mean squared error is minimized, and when the mean squared error is minimized, using the estimate corresponding to the minimum mean squared error as the device spot size parameter.

35. For characterizing a halftone printing process used by a halftone printer that forms device spots, a data storage medium storing a computer-executable program that, when executed, obtains a set of first color values from each of a limited number of test patches, the number of test patches being substantially less than a number of test patches necessary to adequately sample a full range of realizable color combinations;

constructs a halftone printer model using at least one device spot size parameter, the sets of first color values, and a set of addressable units corresponding to device spot locations on a medium, each of the addressable units having an area that is less than an area of a device spot;

generates a set of color separations representing a page of color samples spanning said full range and, from the set of color separations, a set of bitmaps;

applies the halftone printer model to produce a digital representation of the page of color samples in a device-independent color space from the set of bitmaps by:

addressing the device spots to the addressable units based on the bitmaps, thereby producing a plurality of regions within each of the addressable units, each of the plurality of regions having one of $2^N$ colors realizable through bi-level combinations of N colorants, dividing each of the addressable units into a plurality of subunits, determining a number of the subunits in which each of the $2^N$ colors is formed, for each of the $2^N$ colors, calculating a fractional value by dividing a number of the subunits in which the respective color is formed by the total number of subunits, and calculating a set of second color values for each of the addressable units based on the fractional values calculated for each of the $2^N$ colors formed in the respective addressable unit; and generates a device profile that characterizes the halftone printing process as a function of the digital representation.

36. A data storage medium for characterizing a halftone printing process used by a halftone printer that forms device spots, according to claim 35, wherein the computer-executable program stored in the data storage medium centers the device spots on centers of the addressable units.

37. A data storage medium for characterizing a halftone printing process used by a halftone printer that forms device spots, according to claim 35, wherein the computer-executable program stored in the data storage medium centers the device spots on corners of the addressable units.

38. A data storage medium for characterizing a halftone printing process used by a halftone printer that forms device spots, according to claim 35, wherein the computer-executable program stored in the data storage medium selects the color samples from an RGB color cube and converts the selected color samples into the device-dependent color space.

39. A data storage medium for characterizing a halftone printing process used by a halftone printer that forms device spots, according to claim 35, wherein the computer-executable program stored in the data storage medium further integrates the sets of second color values calculated for the addressable units corresponding to each of the color samples to generate a set of integrated color values for the respective color sample;

converts the integrated color values into index color values in an index space; and stores the index color values as entries in a first table.

40. A data storage medium for characterizing a halftone printing process used by a halftone printer that forms device spots, according to claim 39, wherein the computer-executable program inverts the first table to generate a second table.

41. A data storage medium for characterizing a halftone printing process used by a halftone printer that forms device spots, according to claim 40, wherein the computer-executable program applies a smoothing filter to the second table.

42. A data storage medium for characterizing a halftone printing process used by a halftone printer that forms device spots, according to claim 40, wherein the computer-executable program stores the second table in the device profile.

43. A data storage medium for characterizing a halftone printing process used by a halftone printer that forms device spots, according to claim 42, wherein the computer-executable program stores data representing at least one transformation procedure in the device profile.

44. A data storage medium for characterizing a halftone printing process used by a halftone printer that forms device spots, according to claim 35, wherein the computer-executable program, estimates the device spot size parameter by provide an initial value as an estimate of the device spot size parameter, printing the test patches using test patch bitmaps representative of the test patches obtaining the first color values by measuring the test patches, predicting sets of the first color values for the test patches using the halftone printer model, adjusting the estimate based on a mean squared error between the predicted first color values and the measured first color values, iteratively performing the predicting and adjusting steps until the mean squared error is minimized, and when the mean squared error is minimized, using the estimate corresponding to the minimum mean squared error as the device spot size parameter.

45. For use in a system that characterizes a halftone printing process used by a halftone printer to print device spots, a computer arrangement, comprising a computer program programmed to:

obtain a set of first color values from each of a limited number of test patches, the number of test patches being substantially less than a number of test patches necessary to adequately sample a full range of realizable color combinations;

construct a halftone printer model using at least one device spot size parameter, the sets of first color values, and a set of addressable units corresponding to device spot locations on a medium, each of the addressable units having an area that is less than an area of a device spot;

generate a set of color separations representing a page of color samples spanning said full range and, from the set of color separations, a set of bitmaps;

apply the halftone printer model to produce a digital representation of the page of color samples in a device-independent color space from the set of bitmaps by:

addressing the device spots to the addressable units based on the bitmaps, thereby producing a plurality of regions within each of the addressable units, each of the plurality of regions having one of $2^N$ colors realizable through bi-level combinations of N colorants, dividing each of the addressable units into a plurality of subunits, determining a number of the subunits in which each of the $2^N$ colors is formed, for each of the $2^N$ colors, calculating a fractional value by dividing a number of the subunits in which the respective color is formed by the total number of subunits, and calculating a set of second color values for each of the addressable units based on the fractional values calculated for each of the $2^N$ colors formed in the respective addressable unit; and generate a device profile that characterizes the halftone printing process as a function of the digital representation.

46. A computer arrangement for use in a system that characterizes a halftone printing process, according to claim 45, wherein the computer program is programmed to center the device spots on centers of the addressable units.

47. A computer arrangement for use in a system that characterizes a halftone printing process, according to claim 45, wherein the computer program is programmed to center the device spots on corners of the addressable units.

48. A computer arrangement for use in a system that characterizes a halftone printing process, according to claim 45, wherein the computer program is programmed to:

select the color samples from an RGB color cube, and convert the selected color samples into the device-dependent color space.

49. A computer arrangement for use in a system that characterizes a halftone printing process, according to claim 45, wherein the computer program is further programmed to for each of the color samples, integrate the sets of second color values calculated for the addressable units corresponding to the respective color sample to generate a set of integrated color values;

convert the integrated color values into index color values in an index space; and store the index color values as entries in a first table.

50. A computer arrangement for use in a system that characterizes a halftone printing process, according to claim 49, wherein the computer program is further programmed to invert the first table to generate a second table.

51. A computer arrangement for use in a system that characterizes a halftone printing process, according to claim 50, wherein the computer program is further programmed to apply a smoothing filter to the second table.

52. A computer arrangement for use in a system that characterizes a halftone printing process, according to claim 50, further comprising a data storage device configured and arranged to store the second table in the device profile.

53. A computer arrangement for use in a system that characterizes a halftone printing process, according to claim 52, wherein the data storage device is further configured and arranged to store data representing at least one transformation procedure in the device profile.

54. A computer arrangement for use in a system that characterizes a halftone printing process, according to claim 45, wherein the computer program is programmed to estimate the device spot size parameter by providing an initial value as an estimate of the device spot size parameter, printing the test patches using test patch bitmaps representative of the test patches, obtaining the first color values by measuring the test patches, predicting sets of the first color values for the test patches using the halftone printer model, adjusting the estimate based on a mean squared error between the predicted first color values and the measured first color values, iteratively performing the predicting and adjusting steps until the mean squared error is minimized, and when the mean squared error is minimized, using the estimate corresponding to the minimum mean squared error as the device spot size parameter.

55. A method for characterizing a halftone printing device, the method comprising:

constructing a halftone printer model using a device spot size parameter, first color values representative of device output, and addressable units corresponding to device spot locations on a medium;

generating bitmaps defining color separations that represent a page of color samples;

applying the halftone printer model and the bitmaps to produce a digital representation of the color samples in a device-independent color space by:

addressing the device spots to the addressable units based on the bitmaps, thereby producing regions within each of the addressable units having one of $2^N$ colors realizable through combinations of N colorants, dividing each of the addressable units into subunits, determining a number of the subunits in which each of the $2^N$ colors is formed, for each of the $2^N$ colors, calculating a fractional value by dividing a number of the subunits in which the respective color is formed by the total number of subunits, calculating a set of second color values for each of the addressable units based on the fractional values calculated for each of the $2^N$ colors formed in the respective addressable unit; and generating a device profile that characterizes the halftone printing process as a function of the digital representation.

* * * * *